F. O. WARRICK.
CHARGING DEVICE FOR PNEUMATIC TIRES.
APPLICATION FILED MAR. 9, 1909.

966,874.

Patented Aug. 9, 1910.

WITNESSES
W. P. Burke
H. F. Heuman

INVENTOR
Fred O. Warrick
BY Wm Wallace White
ATTY

UNITED STATES PATENT OFFICE.

FRED O. WARRICK, OF NUREMBERG, GERMANY.

CHARGING DEVICE FOR PNEUMATIC TIRES.

966,874.      Specification of Letters Patent.      Patented Aug. 9, 1910.

Application filed March 9, 1909. Serial No. 482,323.

*To all whom it may concern:*

Be it known that I, FRED O. WARRICK, a citizen of the United States, residing at Nuremberg, in the Empire of Germany, have invented a new and useful Charging Device for Pneumatic Tires, of which the following is a specification.

Certain known charging devices for pneumatic tires comprise a tubular casing adapted to be attached to the rim of the wheel, and a globe-valve which after the charging of the tire with compressed air is pressed against its seat by the pressure of the compressed air and acts as a retaining-valve. This globe-valve is adapted to move up and down in the tubular casing. When its stroke is long, it is apt to be violently thrown on its seat by its momentum, whereby it can be damaged.

My invention relates to improvements in such charging devices, whereby the globe-valve is protected from damages, can be thoroughly freed from all adhering dust by the compressed air during the charging operation, and can be easily pushed off its seat for discharging the compressed air from the pneumatic tire.

The chief improvement consists in a dividing insertion, which is forced into the tubular casing from one end for limiting the stroke of the globe-valve and for dividing the area, so that during the charging operation the globe-valve is thrown against the inner end of the insertion by the stream of compressed air and is obliged to roll in various directions on the edge of the insertion, in other words to whirl and thus to present various portions of its outside to the action of the stream.

The other improvement consists in a pin provided on the cap, which normally closes the other end of the casing, so that after taking off the cap the pin can be introduced for pushing the globe-valve off its seat.

I will now proceed to describe my invention with reference to the accompanying drawing, in which—

Figure 1:
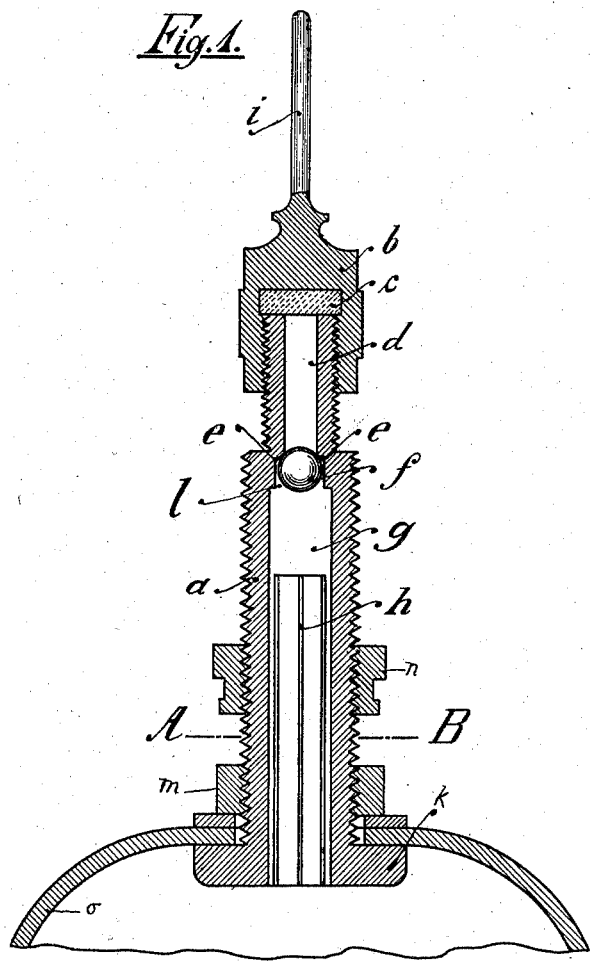
Figure 2:
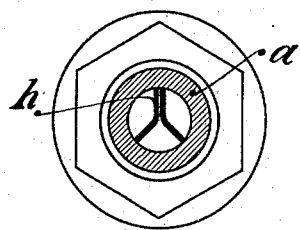

Figure 1 is a vertical longitudinal section on a magnified scale through an improved charging device, Fig. 2 is a horizontal section through the line A—B in Fig. 1, the tire and the rim being omitted.

Similar letters of reference refer to similar parts in the several views.

The charging device illustrated comprises a tubular casing $a$, a dividing insertion $h$, a globe-valve $f$, a cap $b$ made in one with a pin $i$, and a packing disk $c$. The tubular casing $a$ may be of any known construction. For example it is shown as having a lower flange $k$, and two externally screw-threaded portions, of which the upper one is reduced in diameter. This upper reduced portion has a bore $d$ for the introduction of the compressed air and an inner beveled-off shoulder $e$ which serves as a seat for the globe-valve $f$. The larger bore $g$ of the casing $a$ extends from the flange $k$ to a point about on the same level as the lowermost point on the globe-valve $f$, while an intermediate bore $l$ provided between the two bores $g$ and $d$ serves for guiding the globe-valve $f$ before it bears against its seat $e$. The flange $k$ in combination with a nut $m$ serves for air-tightly connecting the tire $o$ with the casing $a$, while the nut $m$ in combination with a counter-nut $n$ serves for fastening the casing $a$ in the rim of the wheel. However, I desire it expressly to be understood, that I do not bind myself to the construction of the tubular casing $a$ shown and described, but reserve to myself the right of employing any other known tubular casing.

It will be seen, that the globe-valve $f$ can be easily introduced from below through the bore $g$ into the casing $a$. A dividing insertion $h$ is according to my invention introduced into the bore $g$ for limiting the stroke of the globe-valve $f$ and for dividing the area of the bore $g$ (see Fig. 2). This dividing insertion $h$ may be formed of a rectangular piece of sheet metal, which is doubled and bent in the middle of its sides so as to spread the outer edges, as is clearly shown at Fig. 2. The dividing insertion may be mechanically produced by means of dies and stamps or the like. It is preferably forced into the bore $g$ of the casing $a$ so as to prevent it from falling out.

It will be seen, that the stroke of the globe-valve $f$ can be kept within convenient limits by selecting a suitable length for the dividing insertion $h$, so that the valve $f$ is protected from damages by violently striking its seat $e$ or the upper end of the insertion $h$.

The upper reduced portion of the tubular casing $a$ is normally closed by a known cap $b$, which is provided with a female screw-thread, the packing disk $c$ of india rubber, leather, or the like serving for tightening the joint. The cap $b$ is according to my invention provided with a pin $i$, the two parts being preferably made in one piece. The pin $i$ is made so long, that on being introduced into the upper bore $d$ of the casing $a$ it can push the globe-valve $f$ off its seat $e$ for permitting the compressed air in the pneumatic tire $o$ to escape to without.

For charging the tire $o$ with compressed air, the cap $b$ is taken off as usual, after which the casing $a$ is connected with the hose of an air-pump by means of a coupling or the like put on in place of the cap $b$. When the pump is actuated for pumping compressed air through the upper bore $d$, the globe-valve $f$ bearing on the upper edges of the dividing insertion $h$ will be set by the stream of compressed air whirling or rolling about on the said edges, since the speed of the air in the three channels formed by the insertion $h$ in the bore $g$ will vary, the stream being throttled in alternating channels by the valve $f$. During its whirling motion the globe-valve $f$ will present various portions of its outside to the stream, so that it will be freed by the latter from all adhering particles of dust that may happen to be on it.

I claim:

A valve comprising a valve casing, a ball valve therein, an insertion piece in said casing extending from the bottom of the casing to a point adjacent the valve seat, said insertion piece dividing the bore of the valve into channels so that the air current passing through the valve is set in a whirling motion, said whirling motion turning the ball valve and cleaning the same from adhering dust particles.

FRED O. WARRICK.

Witnesses:
MATT OESTERLEING,
FRIEDERICH JACOB.